US010030554B2

(12) United States Patent
Addiego et al.

(10) Patent No.: US 10,030,554 B2
(45) Date of Patent: Jul. 24, 2018

(54) SUBSTRATE WITH SINUOUS WEB AND PARTICULATE FILTER INCORPORATING THE SAME

(71) Applicant: Corning Incorporated, Corning, NY (US)

(72) Inventors: William Peter Addiego, Big Flats, NY (US); Michael Edward Badding, Campbell, NY (US); Paul Martin Elliott, Corning, NY (US); Michael Fischer, Corning, NY (US); Thomas Dale Ketcham, Horseheads, NY (US); Denis Pavlovich Lukanin, St. Petersburg (RU); Richard Curwood Peterson, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 81 days.

(21) Appl. No.: 14/792,011

(22) Filed: Jul. 6, 2015

(65) Prior Publication Data
US 2015/0308311 A1 Oct. 29, 2015

Related U.S. Application Data

(63) Continuation of application No. 13/826,476, filed on Mar. 14, 2013, now Pat. No. 9,072,997.
(Continued)

(51) Int. Cl.
| | |
|---|---|
| *B01D 46/24* | (2006.01) |
| *F01N 3/22* | (2006.01) |
| *F01N 3/022* | (2006.01) |
| *B01J 21/06* | (2006.01) |

(Continued)

(52) U.S. Cl.
CPC ....... *F01N 3/0222* (2013.01); *B01D 46/0005* (2013.01); *B01D 46/2403* (2013.01);
(Continued)

(58) Field of Classification Search
CPC ........ B01D 46/04; B01D 46/05; B01D 46/24; B01D 46/61; B01D 46/63; B01D 46/247;
(Continued)

(56) References Cited

U.S. PATENT DOCUMENTS

| | | |
|---|---|---|
| 4,498,989 A | 2/1985 | Miyakawa et al. |
| 5,232,595 A | 8/1993 | Meyer |

(Continued)

FOREIGN PATENT DOCUMENTS

| | | |
|---|---|---|
| JP | 58091361 A | 5/1983 |
| JP | 61015713 A | 1/1986 |

(Continued)

OTHER PUBLICATIONS

JP2015545205 Office Action dated Nov. 17, 2016, Japan Patent Office.
(Continued)

*Primary Examiner* — Heidi R Kelley
*Assistant Examiner* — Karla Hawkins

(57) ABSTRACT

Described herein is a substrate including a central longitudinal axis, a first support web, and a second support web. A sinuous web may be positioned between the first support web and the second support web. The sinuous web may include transverse web portions and bridging web portions, where the bridging web portions alternatively connect ends of adjacent transverse web portions. The sinuous web may be connected to the first support web by support legs extending between bridging web portions and a surface of the first support web. The sinuous web may be connected to the second support web by support legs extending between bridging web portions and a surface of the second support web. A support leg length to distance between transverse web portions ratio may be from about 1.0 to about 4.0.

25 Claims, 7 Drawing Sheets

Related U.S. Application Data

(60) Provisional application No. 61/731,840, filed on Nov. 30, 2012.

(51) Int. Cl.
| | | |
|---|---|---|
| *C04B 38/00* | (2006.01) | |
| *B01D 46/00* | (2006.01) | |
| *C04B 111/00* | (2006.01) | |

(52) U.S. Cl.
CPC ....... *B01D 46/247* (2013.01); *B01D 46/2451* (2013.01); *B01J 21/063* (2013.01); *C04B 38/0006* (2013.01); *C04B 38/0083* (2013.01); *F01N 3/022* (2013.01); *B01D 2046/2488* (2013.01); *B01D 2046/2492* (2013.01); *C04B 2111/00793* (2013.01); *F01N 2330/06* (2013.01); *F01N 2330/30* (2013.01); *F01N 2330/40* (2013.01); *Y02T 10/20* (2013.01)

(58) Field of Classification Search
CPC .............. B01D 46/522; B01D 46/2403; B01D 46/2411; B01D 46/2422; B01D 39/2068; B01D 2046/2488; B01D 2046/2892; C04B 2111/00793; B01J 21/063; F01N 3/0222; F01N 2330/06; F01N 2330/30; Y02T 10/20

See application file for complete search history.

(56) References Cited

U.S. PATENT DOCUMENTS

| | | | |
|---|---|---|---|
| 5,824,232 A | 10/1998 | Asher et al. | |
| 6,136,189 A | 10/2000 | Smith et al. | |
| 6,468,428 B1 | 10/2002 | Nishii et al. | |
| 6,569,330 B1* | 5/2003 | Sprenger | B01D 17/045 210/315 |
| 2002/0141910 A1 | 10/2002 | Adiletta | |
| 2005/0023211 A1 | 2/2005 | Koslow | |
| 2005/0103232 A1* | 5/2005 | Gadkaree | C04B 28/26 106/600 |
| 2010/0006494 A1 | 1/2010 | Scher et al. | |
| 2011/0041469 A1* | 2/2011 | Fischer | B01D 46/2411 55/498 |
| 2012/0125468 A1* | 5/2012 | Bouteiller | B01D 46/2474 138/111 |

FOREIGN PATENT DOCUMENTS

| | | |
|---|---|---|
| JP | 07138533 A | 5/1995 |
| JP | 04061604 U1 | 12/1995 |
| JP | 2002138815 A | 5/2002 |
| JP | 2002227632 A | 8/2002 |
| JP | 2002346326 A | 12/2002 |
| WO | 9318841 | 9/1993 |

OTHER PUBLICATIONS

Patent Cooperation Treaty International Notification Concerning Transmittal of International Preliminary Report on Patentability, international application No. PCT/US2013/072120; dated Jun. 11, 2015, 8 pages.

Patent Cooperation Treaty International Notification of Transmittal of the International Search Report and The Written Opinion of the International Searching Authority, international application No. PCT/US2013/072120; dated Feb. 20, 28, 10 pages.

* cited by examiner

SUBSTRATE WITH SINUOUS WEB AND PARTICULATE FILTER INCORPORATING THE SAME

CROSS-REFERENCE TO RELATED APPLICATIONS

This application is a continuation of and claims the benefit of priority to U.S. patent application Ser. No. 13/826,476, filed on Mar. 14, 2013, which claims the benefit of priority under 35 U.S.C. § 119 of U.S. Provisional Application Ser. No. 61/731,840, filed on Nov. 30, 2012, the contents of which are relied upon and incorporated herein by reference in their entireties.

This application is related to, but does not claim the benefit of, U.S. patent application Ser. No. 13/690,186, filed Nov. 30, 2012, for Trough Filter With Integrated Thermoelectric Generator, Vehicle Including Trough Filter, and Method of Treating Exhaust Gas.

BACKGROUND

Field

The present disclosure relates substrates for catalytic conversion or filtering of gas streams, and to wall flow filters comprised of ceramic that are suitable for appreciable radial wall flow.

Technical Background

Ceramic honeycomb substrates and honeycomb filters for mobile exhaust systems are known. Square and rectangular honeycomb cells are generally made via extrusion. Particulate emissions in exhaust gas from diesel engines are typically handled by wall flow honeycombs with low thermal expansion materials such as cordierite or aluminum titanate based materials. The commercial products have generally straight, axially aligned channels with uniform cross-sections and plugs in alternating checker board patterns on the ends of the honeycomb pieces to force the exhaust gas through the cell channel walls.

BRIEF SUMMARY

Embodiments of this disclosure provide a substrate having longitudinal channels through which a fluid may pass. The substrate may include a central longitudinal axis, a first support web, and a second support web. A sinuous web may be positioned between the first support web and the second support web. The sinuous web may include transverse web portions and bridging web portions, where the bridging web portions alternatively connect ends of adjacent transverse web portions closer in proximity to the longitudinal axis and ends of adjacent transverse web portions further in proximity from the longitudinal axis. The bridging web portions and the transverse web portions may form a sinuous shape in a cross section perpendicular to the longitudinal axis. The sinuous web may be connected to the first support web by support legs extending between bridging web portions and a surface of the first support web facing away from the longitudinal axis. The sinuous web may be connected to the second support web by support legs extending between bridging web portions and a surface of the second support web facing toward the longitudinal axis. A support leg length to distance between transverse web portions ratio may be from about 1.0 to about 4.0.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

It is to be understood that both the foregoing general description and the following detailed description are exemplary and explanatory only, and are not restrictive. Other embodiments will be apparent from consideration of the specification.

The substrates disclosed herein may provide enhanced radial flow through porous ceramic walls, and may be referred to as particulate filters or radial wall flow particulate filters. The particulate filters may be employed to remove particulate material from an exhaust stream, such as a combustion engine exhaust stream.

Figure 1:
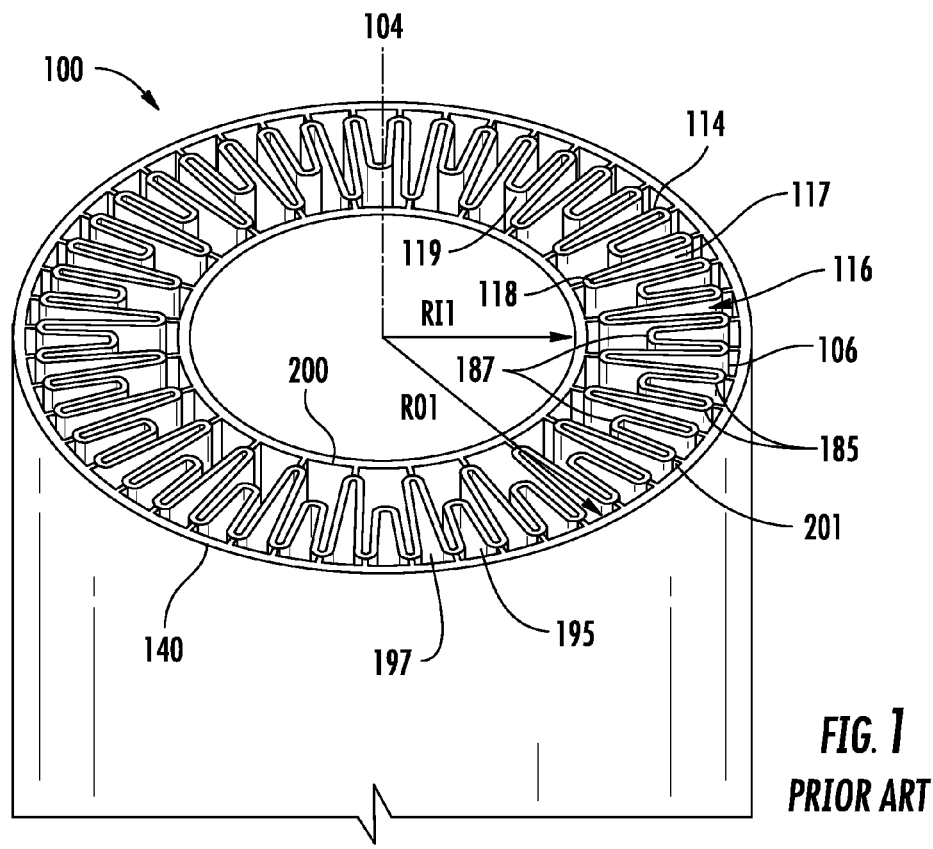
FIG. 1 illustrates a single layer filter of related art, where the filtering troughs have two different lengths.
Figure 2:
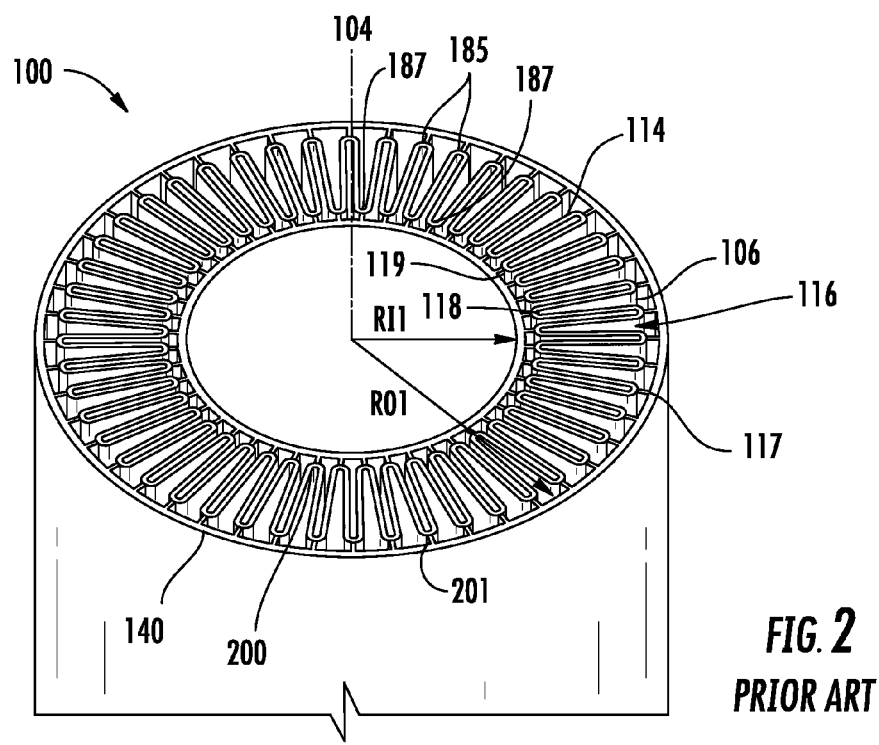
FIG. 2 illustrates a single layer filter of related art, where the filtering troughs have a single length.

FIGS. 1 and 2 illustrate particulate trough filters of related art. The particulate trough filter 100 may have a central longitudinal axis 104, the filter 100 may comprise a plurality of adjacent troughs 106 circumferentially arranged around the longitudinal axis 104. Each trough 106 may have an open end 116 and a closed end 118 disposed opposite the open end 116.

In the filters shown in FIG. 2, the walls 114 of the troughs 106 at the open end 116 terminate at substantially the same outer radius RO1 or inner radius RI1 (depending on the radial orientation of the trough), and the closed end 118 of the troughs 106 is disposed at substantially the same outer radius RO1 or inner radius RI1. However, as shown in FIG. 1, the walls 114 of the troughs 106 may not terminate at substantially the same outer radius RO1 or inner radius RI1, and the closed end 118 of the troughs 106 may not be disposed at substantially the same outer radius RO1 or inner radius RI1.

Referring again to FIGS. 1 and 2, the filter 100 may further comprise an outer peripheral wall 140 surrounding the troughs 106. In the configuration shown, the outer peripheral wall 140 covers the open ends 116 of the troughs 106 via support portions 201 that are attached to the closed ends 118 of the troughs 106, and moreover the outer peripheral wall 140 covers the radially outward facing open ends 116 of the troughs 106 along substantially the entire length of the filter 100.

FIG. 1 shows the walls 114 of each trough 106 having rounded surfaces 185 proximate to their open end 116 and rounded surfaces 187 proximate to their closed end 118. As shown in FIG. 1, the troughs 106 comprise first 195 and second 197 subsets of troughs, the closed ends 118 of the troughs 106 of the first subset 195 being disposed farther away from the central longitudinal axis 104 than the closed ends 118 of the troughs 106 of the second subset 197. In each subset of troughs, the rounded surfaces 185 proximate to open ends 116 round toward adjacent troughs, such that adjacent trough walls converge to form one common radially extending wall segment 117 between the outermost part of rounded surfaces 185 and outer radius RO1. In the second subset 197 of troughs, the rounded surfaces 187 proximate to closed ends 118 round toward each other, such that the trough walls converge to form one common radially extending wall segment 119 between the innermost part of rounded surfaces 187 and inner radius RI1. As shown in FIG. 1, the filter additionally includes an outer peripheral wall 140 having a radius that is approximately equal to RO1 and an inner peripheral wall 200 having an radius that is approximately equal to RI1, such that the outermost portion of the walls 114 of each trough contact outer peripheral wall 140 via support portions 201 and the innermost portion of walls 114 of each trough contact inner peripheral wall 200 via support portions 201.

FIG. 2 shows a configuration that is similar to the configuration shown in FIG. 1, except the closed ends 118 of all the similarly oriented troughs 106 are disposed approximately the same distance away from the central longitudinal axis 104 and the rounded surfaces 187 proximate to closed ends 118 of each trough are rounded toward each other such that the trough walls 114 of each trough converge to form one common radially extending wall segment 119 between the innermost part of rounded surfaces 187 and inner radius RI1.

Figure 3:
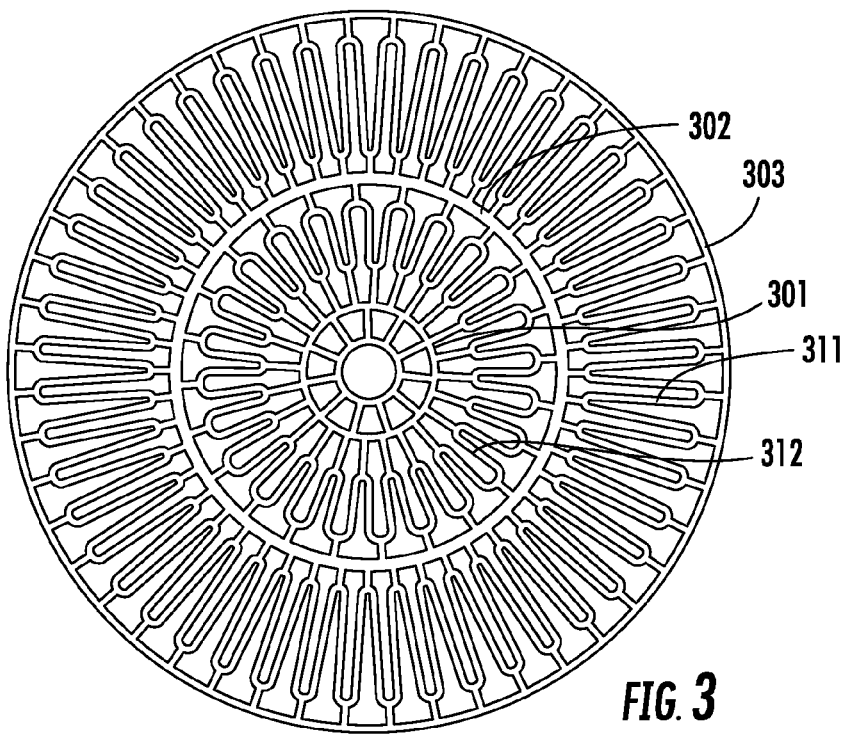
FIG. 3 illustrates a substrate with two crowns of sinuous filter elements, three support webs, and support legs connecting the sinuous filter elements with the cylindrical support webs.

Referring now to FIG. 3, in embodiments, the substrate may comprise two crowns of sinuous web 312 and 311. The sinuous web 312 is bound at its inner diameter by a support web 301, and bound at its outer diameter by a support web 302. The support webs 301 and 302 may be made of the same or different material as the sinuous web. In embodiments, the support web 301 and 302 may be porous; however, in other embodiments, the support web 301 and 302 may be non-porous. The second crown comprising sinuous web 311 may be made of the same or different material as the sinuous web 312. In embodiments, the sinuous web 311 may be contacted at its inner diameter by support web 302, and the sinuous web 311 may be contacted at its outer diameter by a support web 303. In embodiments, the support web 303 may be made of the same or different material as support webs 301 and 302. In embodiments, the support web 303 may be porous; however, in other embodiments, the support web may be non-porous.

It should be understood that the substrate may comprise any suitable number of crowns of sinuous webs. For example, the substrate may include three or more crowns, four or more crowns, five or more crowns, six or more crowns, or seven or more crowns, etc. In embodiments, the crowns may be configured so that an outer diameter support web of one crown also serves as an inner diameter support web of an adjacent crown. For example, in the embodiment shown in FIG. 4, the substrate comprises four crowns having increasing diameters. Each of the four crowns comprise a sinuous web 312, 311, 313, and 314 bound by five support webs 301, 302, 303, 304, and 305. Support web 302 may be the outer diameter support web for the crown comprising sinuous web 312, and it may be the inner diameter support web for the crown comprising sinuous web 311. Likewise, support web 303 may be the outer diameter support web for the crown comprising sinuous web 311, and it may be the inner diameter support web for the crown comprising sinuous web 313. Similar structure may be repeated for the crowns comprising sinuous web 314 and support webs 304 and 305.

Figure 4:
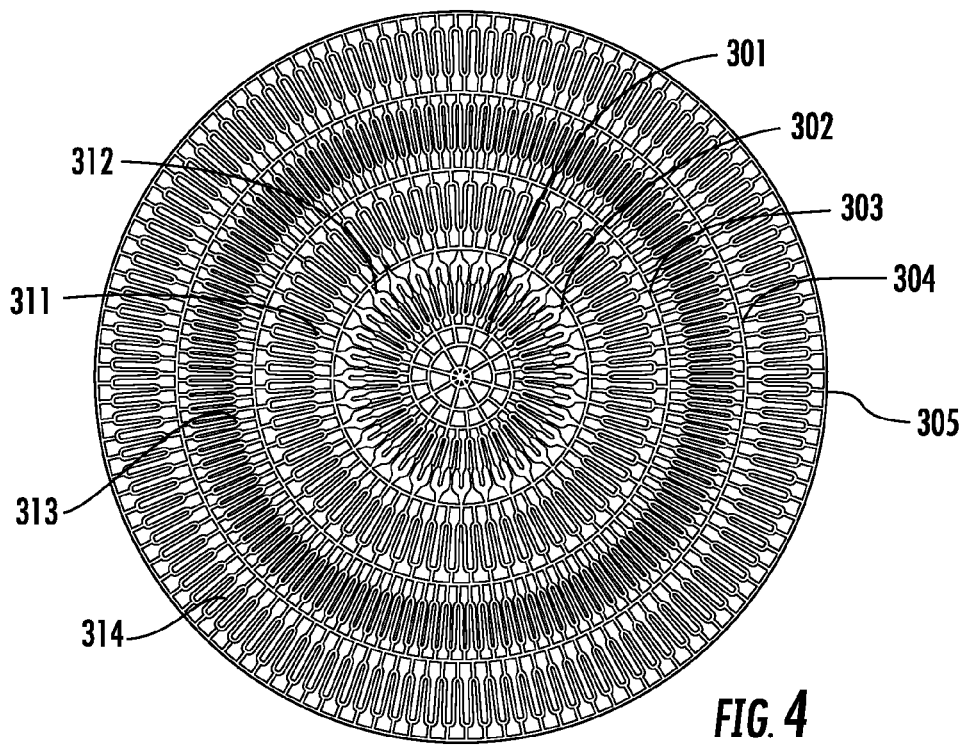
FIG. 4 illustrates a substrate with four crowns of sinuous filtering elements, five support webs and support legs connecting the sinuous filtering elements to the support webs.

In embodiments, such as illustrated in FIGS. 3 and 4, the substrate may have a generally circular transverse cross-sectional shape, although other embodiments may have other cross-sectional shapes such as square, rectangular, triangular, oval, or hexagonal. In some configurations, such as illustrated in FIGS. 3 and 4, the substrate is a circular cylindrical filter body.

Figure 5:
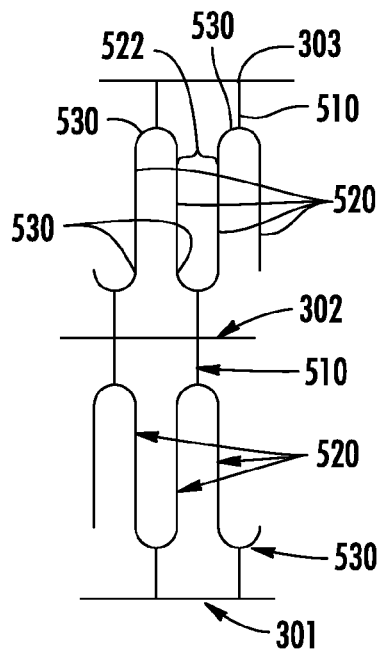
FIG. 5 is a schematic showing elements in a sinuous filtering element and support web.

Referring now to FIG. 5, the components of the individual crowns will be described in more detail. The sinuous web in each crown may comprise transverse web portions 520 and bridging web portions 530. In embodiments, the transverse web portions 520 may be longer than a gap between adjacent transverse web portions 522. In some embodiments, the length of the transverse web portions may be greater than two times a distance between adjacent transverse web portions, or even greater than three times a distance between adjacent transverse web portions. In some embodiments, the length of the transverse web portions may be greater than about four times a distance between adjacent transverse web portions, or even greater than about five times a distance between adjacent transverse web portions. Although all the transverse web portions 520 shown in FIG. 5 have the same length, it should be understood that various transverse web portions may be shorter than various other transverse web portions, as shown in FIG. 1. In some embodiments, the sinuous web may be formed by connecting the transverse web portions 520 with the bridging web portions 530. According to the embodiment shown in FIG. 5, the bridging web portions 530 may be rounded and connect the ends of adjacent transverse web portions 520. The bridging web portions 530 may alternatively connect adjacent transverse web portions at positions closer in proximity to the center axis and at positions further in proximity from the central axis, thereby forming a sinuous web.

In embodiments, the sinuous web may be connected to a support web 303, 302, or 301 by support legs 510. For example, the support legs may attach a bridging web portion 530 to a support web 303, 302, or 301, as shown in FIG. 5. The support legs may be made from any suitable material and may be the same or different material than the support web and/or the sinuous web. The support legs may have a length that is shorter than a length of the transverse web portions 520. In embodiments, the length of the support legs

510 may be less than ¾ the length of the transverse web portions 520, or even less than ⅔ the length of the transverse web portions. In other embodiments, the length of the support legs may be less than ½ the length of the transverse web portions, or even less than ⅓ the length of the transverse web portions.

Figure 6:
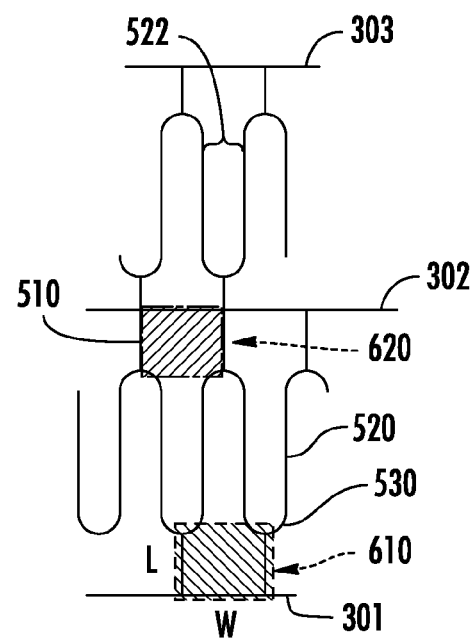
FIG. 6 is a schematic showing fluid entrance portions and fluid exit portions.

Referring now to FIG. 6, fluid exit portions or fluid entrance portions may be formed between adjacent support legs 510. The fluid entrance portions or fluid exit portions may run the entire length of the substrate, or any portion thereof. Fluid may flow in a direction parallel to the central axis of the substrate. For example, portion 620 may be a fluid exit portion, and portion 610 may be a fluid entrance portion. The width W of the fluid entrance or exit portions 610 and 620 may be greater than the distance between adjacent transverse web portions 522. In embodiments, the width of the fluid entrance or exit portions 610 and 620 may be greater than about 1.1 times the distance between adjacent transverse web portions, or even greater than about 1.3 times the distance between adjacent transverse web portions. In other embodiments, the width of the fluid entrance or exit portions 610 and 620 may be greater than about 1.5 times the distance between adjacent transverse web portions, or even greater than about 1.7 times the distance between adjacent transverse web portions. In some embodiments, the width of the fluid entrance or exit portions 610 and 620 may be greater than about 1.9 times the distance between adjacent transverse web portions.

Figure 15:
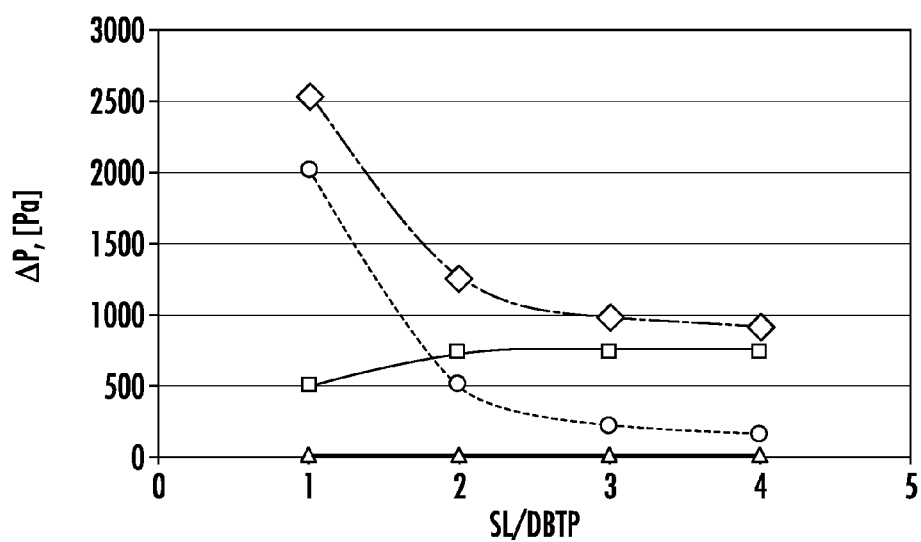
FIG. 15 is a graph of pressure drop versus a support leg length to distance between transverse web portions ratio.

The length of the fluid entrance or exit portions 610 and 620 may determined by the length L of the support legs 510, which may be the same as or greater than the distance between adjacent transverse web portions 522. In embodiments, the support leg length to distance between adjacent transverse web portions ratio may be from about 1.0 to about 4.0, or even from about 1.5 to than about 3.5. In other embodiments, the support leg length to distance between adjacent transverse web portions ratio may be from about 2.0 to about 3.0, or even about 2.5. Referring briefly to FIG. 15, which is described in more detail below, the pressure drop across the filter wall may decrease significantly when the support leg length to distance between adjacent transverse web portions ratio is increased from about 1.0 to about 2.0, and the decrease in pressure drop may taper off as the support leg length to distance between adjacent transverse web portions ratio is increased above 3.0. Thus, in embodiments, the pressure drop may be optimized when the support leg length to distance between adjacent transverse web portions ratio is some value between about 1.0 and about 4.0.

In addition to the fluid entrance and fluid exit portions, the substrate may include fluid filter portions. The fluid filter portions include an area between adjacent transverse web portions 522. In embodiments, first fluid filter portions may include the area between adjacent transverse web portions on one side of the sinuous web, and second fluid filter portions may include the area between adjacent transverse web portions on an opposite side of the sinuous web. In some embodiments, the first fluid filter portions may be in fluid communication with the fluid entrance portions, thereby forming first fluid channels. In embodiments, the second fluid filter portions may be in fluid communication with the fluid exit portions, thereby forming second fluid channels.

In embodiments, for a filter having a 5.7 inch diameter, the fluid flow through the substrate may be about 10 SCFM or greater, such as about 50 SCFM or greater, about 100 SCFM or greater, or about 250 SCFM or greater. It should be understood that fluid flow may vary depending on the size and configuration of the filter. In embodiments, the pressure drop across a filter having a 5.7 inch diameter and subject to a fluid flow of 10 SCFM may be less than about 1.50 kPa, such as less than about 1.25 kPa, less than about 1.10 kPa, or even less than about 1.00 kPa.

Figure 7:
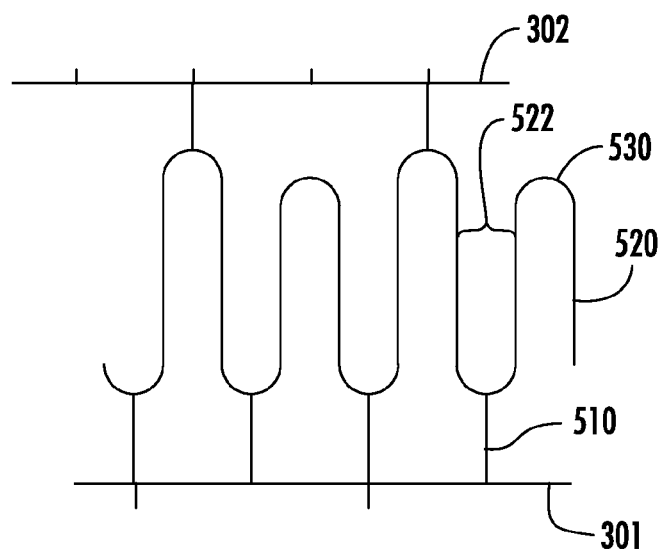
FIG. 7 is a schematic showing the entrance and exit portions for the sinuous filtering structure where all the transverse web portions are not equal and not all the bridging web portions are connected bridging web portions.

Referring now to FIG. 7, in embodiments, each bridging web portion 530 may not be connected to a support web 301, 302. Such a configuration increases the dimensions of a fluid entrance or exit portion by a factor of about two or more. As shown in FIG. 7, when a support leg 510 is not connected to a bridging web portion, the fluid exit portion or fluid entrance portion increases to span between the support legs. As the dimensions of the entrance or exit portions increase in relation to the narrower distance between adjacent transverse web portions 522, pressure drop may be lowered. Although FIG. 7 shows only one bridging web portion not connected to a support web via a support leg, it should be understood that more than one bridging web portion may not be connected to a support web via a support leg.

Figure 8A:
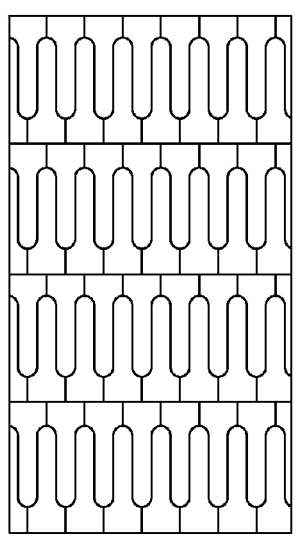
FIGS. 8A and 8B are schematics showing support legs that are offset and aligned, respectively.
Figure 8B:
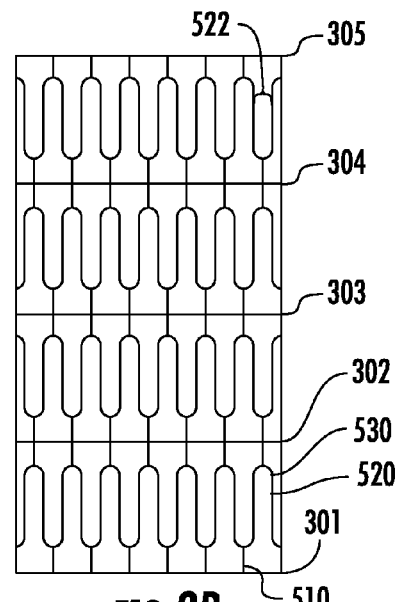

FIGS. 8A and 8B show configurations of the sinuous web in each crown. FIG. 8A shows a configuration where a support leg from one crown does not meet (i.e., radially align with) the support leg of an adjacent crown at a support web between the crowns. The configuration in FIG. 8A may be referred to as an offset configuration. FIG. 8B shows a configuration where the support leg of one crown meets (i.e., radially aligns with) the support leg of an adjacent crown at a support web between the crowns. This configuration may be referred to as an aligned configuration. However, it should be understood that it may be difficult to exactly align each support leg in substrates of radial symmetry or substrates having some curvature, thus an aligned configuration may not have the support legs exactly aligned.

The substrate 100 may comprise one or more longitudinal end plugs that contactingly block selected fluid channels at one or both longitudinal end(s) of the substrate. In some embodiments the longitudinal end plug(s) may be comprised of porous ceramic. In other embodiments, the longitudinal end plug(s) may be comprised of a non-porous material that inhibits the flow of gas therethrough. All or part of the longitudinal ends of the substrate may be plugged, as discussed in more detail below.

Figure 9A:
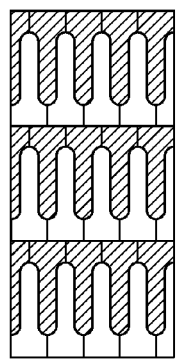
FIGS. 9A and 9B are schematics showing plugging of exit portions and filter troughs and showing plugging of entrance portions and filter troughs.
Figure 9B:
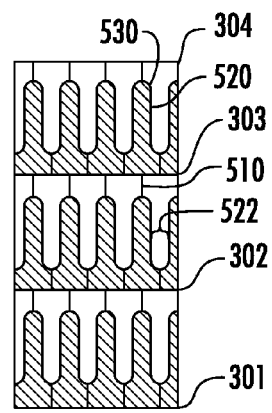

A variety of plugging geometries may be utilized, and the following embodiments are not limiting. As shown in the embodiment of FIG. 9A the first fluid channels (i.e., the fluid entrance portions and the associated first fluid filter portions) may be plugged. FIG. 9B shows the second fluid channels (i.e., the fluid exit portions and the associated second fluid filter portions) being plugged. Such plugging may be present on opposite lateral ends of the substrate, where the lateral ends may include the outermost surfaces of the substrate perpendicular to the center axis. For example, one lateral end of the substrate may plug the entrance portions and the filtering troughs they communicate with, and the opposite lateral end of the substrate may plug the exit portions and the filtering troughs they communicate with.

Figure 10A:
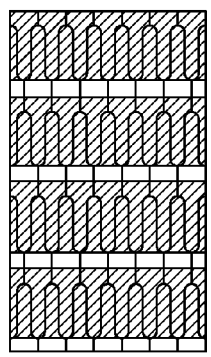
FIGS. 10A and 10B are schematics showing plugging of multiple exit portions and all filter troughs and showing plugging of multiple entrance portions and all filter troughs.
Figure 10B:
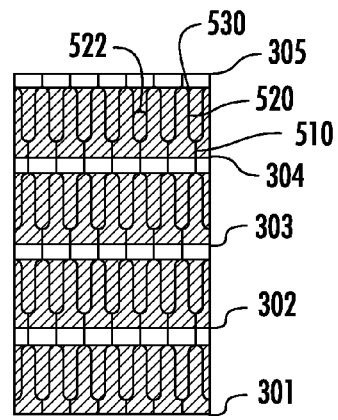

Other plugging configurations according to embodiments are shown in FIGS. 10A and 10B. As shown in FIG. 10A, the first fluid channels (i.e., the fluid entrance portions and the associated first fluid filter portions) and the second fluid filter portions are plugged. As shown in FIG. 10B, the second fluid channels (i.e., the fluid exit portions and the associated second fluid filter portions) and the first fluid filter portions are plugged. The plugging configurations shown in FIGS. 10A and 10B may be used individually or together. For example, the plugging configuration shown in FIG. 10A may be used at one lateral end of the substrate, and the configuration shown in FIG. 10B may be used at the opposite lateral end of the substrate. Such configurations will allow fluid to enter or exit the substrate only at the entrance or exit portions and, thus, may allow the fluid more residence time in the filter troughs to increase fluid filtration.

Substrates may be manufactured by methods such as extrusion, 3-D printing, folding and bonding methods using sheets of green ceramic, injection molding, or slip casting.

Substrates of embodiments may be advantageously manufactured by extrusion. The shapes can be extruded vertically, horizontally, or any angle in-between. In embodiments, the substrates may be rapidly stiffened at the die exit or they can be extruded from the die onto a mandrel to avoid shape collapse. The dies can be patterned to allow the shapes to be extruded using methods known to those skilled in the art, including, but not limited to, direct metal laser sintering (DMLS).

Embodiments of the substrates of the present disclosure can also be made by slip/pressure casting. An inner mold may be made with very low mass to avoid lengthy mold burn out/sublimation schedules or cost. For pressure casting, the mold may need significant structural rigidity, but should have provisions for fluid escape, such as a porous surface layer with increasingly larger pores or porosity amount toward the center of the mold. For slip casting, the mold may be fairly uniform in porosity, but the slip vehicle should wet the mold. The slip casting mold may have a graded porosity structure as well. Both molds could be hollow or be mostly hollow with strengthening/supporting ribs. The inner mold could be supported on a mandrel, with provisions for slip vehicle escape to further lower the amount of material in the mold.

Embodiments of the substrates of the present disclosure may also be made by injection molding. For injection molding the inner mold may have some taper to the inner diameter and the interior part of the troughs may also taper so that the injected part can be removed easily.

Injection molding a polymer mold for pressure or slip casing can be an efficient method. Injection molding of ceramics can be costly as the ceramic powder abrades the die and causes short die life. However most polymer/organic materials do not wear the die as much as a ceramic filled material and the polymer mold product usually has more elasticity/plasticity, leading to higher yields and the possibility of more intricate designs and features.

Embodiments of the present disclosure are solid but porous wall flow ceramic exhaust filters that may provide substantially more cell walls oriented in a generally radial direction than cell walls oriented in a generally circumferential direction. Embodiments of the filters of the present disclosure may provide more exhaust gas flow both in the radial/circumferential directions than regular square cell/rectangular cell/hexagonal cell honeycomb filters. Embodiments of the filter structures of the present disclosure can have more radial/circumferential compliance than known honeycomb structures, particularly square cell honeycombs.

It is believed that the shorter distance between transverse web portions of the sinuous web in embodiments of the present disclosure may provide lower pressure drops across the particulate filter and lower clean back pressure than regular square cell or ash storage concept cell designs with similar wall thicknesses. Filters according to embodiments of the present disclosure may also provide lower regeneration temperatures than square cells. Filters with more than one crown may provide higher filtering capacity, higher soot loading, and lower soot loading back pressure. Filters of embodiments may be easily plugged and may be made by extrusion, which could lead to lower costs.

For unitary cylindrical diesel and gasoline engine exhaust gas filters, the trough filter may be greater than about three inches in diameter, or even greater than about four inches in diameter. In some embodiments, the filter may be greater than about 5 inches in diameter, or even greater than about six inches in diameter. The filter may be 3 inches or longer, or even longer than 4 inches. The outer crown of a filter may be greater than 5.5 inches in diameter, and have greater than 120 troughs. A filter with a support web greater than 4 inches in diameter may have greater than 80 troughs attached to the support web. A filter with a support web greater than 3 inches in diameter may have greater than 50 troughs attached to it. A support web greater than 2 inches in diameter may have greater than 20 troughs attached to it.

A gasoline or diesel engine exhaust gas filter having multi-crown trough filters may have a filtering surface area of greater than 10 square inches per cubic inch. The multi-crown trough filter may have a filtering surface area greater than 20 square inches per cubic inch. The web thickness of a trough filter may be less than 25 mils, or even less than 20 mils. In some embodiments, the web thickness may be less than 15 mils.

The multi-crown trough filter may be made from low expansion aluminum titanate, cordierite, niobates, etc., and from materials with higher expansion coefficients such as silicon carbide, silicon bonded silicon carbide, silicon nitride, sialons, mullite, etc.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that terms like "commonly" when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims.

EXAMPLES

Example 1

A 2-inch diameter die with 20 mil webs was made by Direct Laser Metal Sintering, a 3D manufacturing method.

FIG. 3 illustrates a particulate filter that was formed. The particulate filter was an extruded, dried, and fired aluminum titanate (such as aluminum titanate prepared as described in U.S. Pat. No. 7,259,120, which is incorporated herein by reference in its entirety) with two crowns of sinuous filtering webs. The particulate filter was 2 inches in diameter and was extruded using a 32 mm twin screw extruder at 1,500-2,000 psi with batch components including alumina, titania, methocel, durasin oil, oleic acid, graphite, and water. The extrudate was dried and stiffened using microwave radiation then air dried in an oven at 120° C. for 20 hours. The dried particulate filter was fired using 1427° C. as a top temperature with a 16 hour hold. The filter had 20 mil web thickness and 48 troughs on the outer filtering crown and 24 troughs on the inner filtering crown. The extruded and fired parts have four cylindrical support webs.

The outer crown of sinuous webs had a transverse web portion length of 9-10 mm, and a minimum spacing of about 1 mm. The bridging web portions connecting the longer transverse web portions were somewhat rounded and about 1 mm in length, and the support legs were 1 mm in length. For the inner crown of the sinuous web, the transverse web portion length was 5 mm, at the minimum spacing the transverse web portions were about 1 mm apart. The bridging web portions connecting the longer transverse web portions were somewhat rounded and about 1 mm in length, and the bridging web portions were 1 mm and 2 mm in length.

The entire particulate filter (i.e., the support web, bridging web portions, transverse web portions, and support legs) was of the same aluminum titanate material. The support webs were the same material as the other components of the particulate filter. The support webs form a circumferential cylinder structure between the crowns of the sinuous webs, the outer surface and inner support cylinders.

There were three of these support webs in the extrudate, as shown in the embodiment of FIG. 3. Some of this structure was machined or eliminated after firing, but before use of the filter.

Example 1 has two crowns of sinuous webs having a series of transverse web portions, at or greater than 4 times the length of the distance between the transverse web portions. The alternating ends of these transverse web portions were connected by rounded bridging web portions. The bridging web portions were connected to the ends of alternate transverse web portions to form a sinuous web. Support legs connect the bridging web portions to the support web. The support legs were less than ½ the length of the transverse web portions, and connect to the support webs between the sinuous web. The width of fluid entrance or exit portion was 2 mm, greater than 1.9 times the width of the minimum distance between adjacent transverse web portions (minus the thickness of the webs).

For initial pressure drop and regeneration temperature testing, the inner crown of the filter was removed. A six inch part was segmented axially into two 3-inch long parts. The cylindrical support webs were machined to provide the fluid with easy access to the filtering layer. Three "donut" plugs (two for the entrance segment and one for the exit segment) were formed by hand using a cordierite-based cold set plugging batch. The disk plug for the exit end of the second filter segment was made from a thin slice of radial flow honeycomb with cold set plugging batch over the entire surface in all the channels, and attached to the main particulate filter with cold set batch. After the cold set batch dried, it was smoothed by hand using sand paper. Two 3-inch segments were tested for pressure drop and regeneration temperatures (one entrance segment and one exit segment). For clean pressure drop testing, rubber gaskets and fiber mat spacers were used. For regeneration testing fiber mat spacers and gaskets were used.

Figure 11:
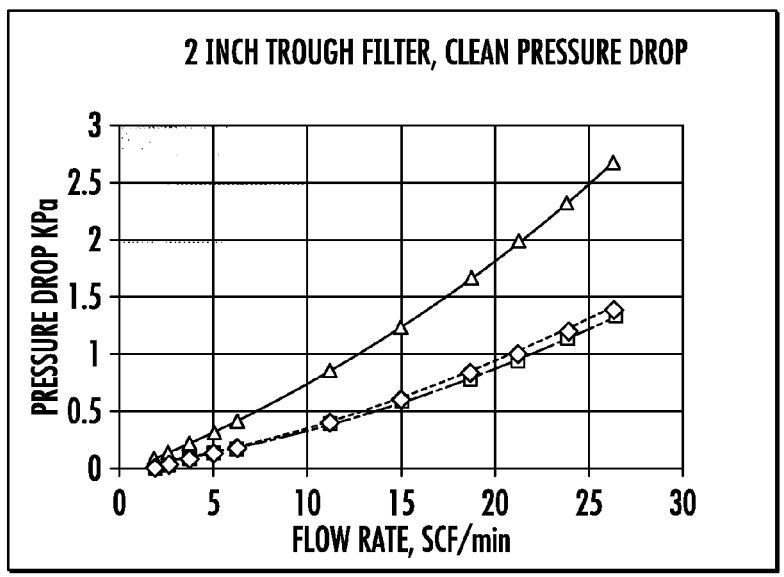
FIG. 11 is a graph showing the clean pressure drop versus gas flow of a trough filter compared to a square cell honeycomb.

FIG. 11 shows the results of clean pressure drop testing of the single crown trough filter and a 295 psi square cell aluminum titanate honeycomb having a 15 mil web thickness versus gas flow rate. In FIG. 11, the trend line indicated with triangles shows a square cell aluminum titanate honeycomb having approximately 295 cells per square inch and a 15 mil wall thickness (i.e., a "295/15" geometry), the trend line indicated by squares shows the outer crown of the trough filter with a center hole inlet, and the trend line indicated by diamonds shows the outer crown of a trough filter with outside flow. The trough filter has approximately less than half the clean pressure drop of a regular square cell honeycomb despite this example having only 40% the filtering surface area of the square cell honeycomb and having thicker filtering webs, 20 mil as opposed to 15 mil for the square cell.

Figure 12:
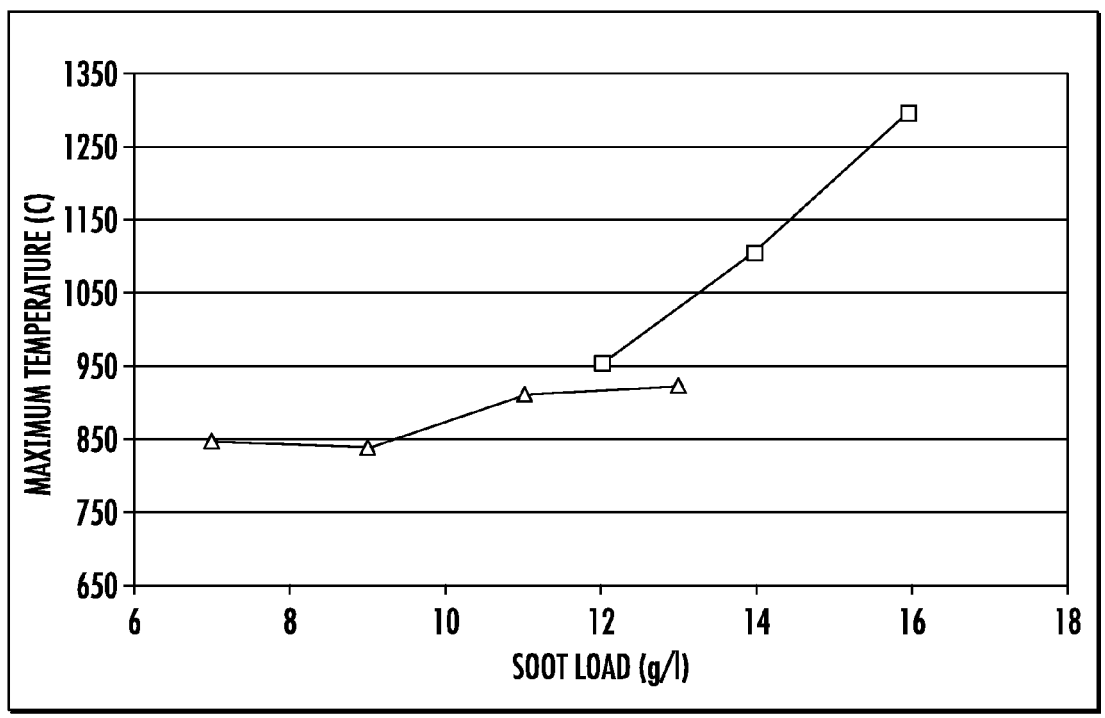
FIG. 12 is a graph showing regeneration maximum temperature versus soot loading for a trough filter compared to a square cell honeycomb.

FIG. 12 shows the results of regeneration maximum temperature versus soot load of the single crown trough filter and a square cell aluminum titanate honeycomb having a 295/15 geometry. In FIG. 12, the trend line indicated with triangles shows a trough configuration, and the trend line indicated by squares shows a honeycomb configuration. The trough filter has much lower regeneration maximum temperature despite having less than half the clean pressure drop of a regular square cell honeycomb. This was despite this example having only 53% (40%×1.33) the thermal mass of the square cell honeycomb.

Example 2

A 2-D fluid flow pressure drop computer model calculation was performed for a 2 inch single layer trough filter with 1 cm trough lengths and a 20 mil filtering web thickness, having a configuration similar to Example 1. The model did not include restricted entrance and exit portions. This model also did not include the radial taper of the fine fluid filtering channel in Example 1 and the ends of the filtering channel in the model were square, not rounded. The support legs were not included in the model.

Figure 13:
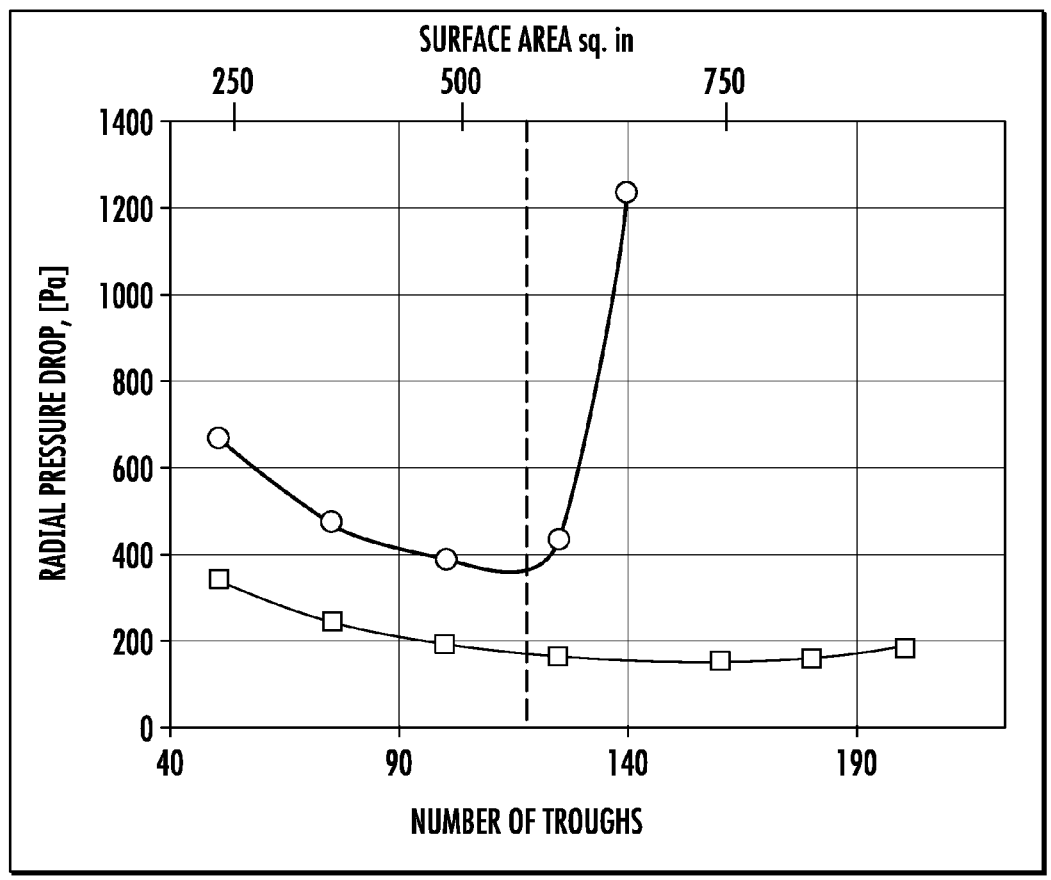
FIG. 13 is a graph showing pressure drop versus number of troughs and trough web thickness for a trough filter.

FIG. 13 shows the results of this computer model. In FIG. 13, the trend line indicated with circles shows a wall thickness of 20 mils, and the trend line indicated by squares shows a wall thickness of 10 mils. This calculation indicates pressure drop for a single filtering crown can be lowered by 2 times by increasing the number of filtering troughs from 50 to 120-130 with web thickness of 20 mils in a 2-inch diameter filter. Pressure drop can be lowered even further by lowering the web thickness to 10 mils and simultaneously increasing the number of troughs to over 150-180 in a 2 inch diameter filter.

Example 3

A 5.7 inch diameter die with 2 mil webs was made by Direct Laser Metal Sintering, a 3D manufacturing method. An extruded, dried, and sintered aluminum titanate particulate filter with four crowns of sinuous filtering webs was produced. The filter was extruded using a ram extruder at 1,500-1,800 psi. The extrudate was dried and stiffened using microwave radiation then air dried in an oven at 120° C. for 20 hours. The dried particulate filter was fired using 1427° C. as a top temperature. The filter has 20 mil web thickness and 120 troughs on the outer filtering crown, 96 troughs on the middle outer crown, 64 troughs on the middle inner crown and 32 troughs on the inner filtering crown. The extruded and the fired parts have four support webs attached directly to the sinuous filtering elements and six cylindrical support webs total.

The entire particulate filter was made of the same material. Between the crowns of sinuous webs defining asymmetric length to width cells, there were support webs that physically support the particulate filter. The support webs were made of the same material as the filtering web. The support webs form circumferential cylindrical structures between the crowns of the sinuous webs and the inner supports.

There were four of support webs between the sinuous webs in the extrudate. Some of this structure can be machined and/or eliminated after firing, but before use of the filter.

The filter of Example 3 has four crowns of sinuous webs having a series of transverse web portions of 1 cm, greater than five times longer than the minimum 1 mm gap between the transverse web portions. The alternating ends of these transverse web portions were connected by bridging web portions. These bridging web portions were rounded, and were 1 mm in diameter. The bridging web portions were connected to the ends of alternate transverse web portions to form a unitary sinuous web. Support legs were 2 mm, less than ⅓ the length of the transverse web portions, and were connected to the support webs between the sinuous elements. Support legs length of 2 mm and a distance between transverse web portions of 1 mm gives a support leg length toe distance between transverse web portions ratio of 2.

The fired particulate filter of Example 3 was over 6 inches long.

Example 4

A 5.7 inch diameter die with 20 mil webs was made by Direct Laser Metal Sintering, a 3D manufacturing method. An extruded, dried, and sintered aluminum titanate particulate filter with four crowns of sinuous filtering webs was formed. The filter was extruded using a ram extruder at 2,000 psi. The extrudate was dried and/or stiffened using microwave radiation then air dried in an oven at 120° C. for 20 hours.

The dried particulate filter was fired using 1427° C. as a top temperature with a 16 hour hold. The filter has 20 mil web thickness and 120 troughs on the outer crown, 96 troughs on the middle outer crown, 64 troughs on the middle inner crown, and 32 troughs on the inner crown. The extruded and the sintered parts have five support webs attached directly to the sinuous web and seven cylindrical support webs in total.

The entire particulate filter was made of the same material, aluminum titanate. Between the crowns of sinuous web elements, there were support webs that physically support the particulate filter. The support webs were the same material as the filtering web. The support webs form circumferential cylindrical structures between the crowns of the sinuous webs and the inner support cylinders.

There were five of these support webs in the extrudate. Some of this structure may be machined and/or eliminated after firing, but before use of the filter.

The filter of Example 4 has four crowns of sinuous web having a series of transverse web portions of 8 mm, greater than five times longer than the minimum 1 mm distance between the transverse web portions. The alternating ends of these transverse web portions were connected by bridging web portions. These bridging web portions were rounded, having 1 mm diameter. The bridging web portions were connected to the ends of alternate transverse web portions to form a unitary physical filtration element. Support legs were 2.5 mm, less than ⅓ the length of the transverse web portions, and connect to the support webs between the sinuous elements. Support legs lengths of 2.5 mm and a distance between transverse web portions of 1 mm gives a support leg length to distance between transverse web portion ratio of 2.5.

Example 5

Figure 14:
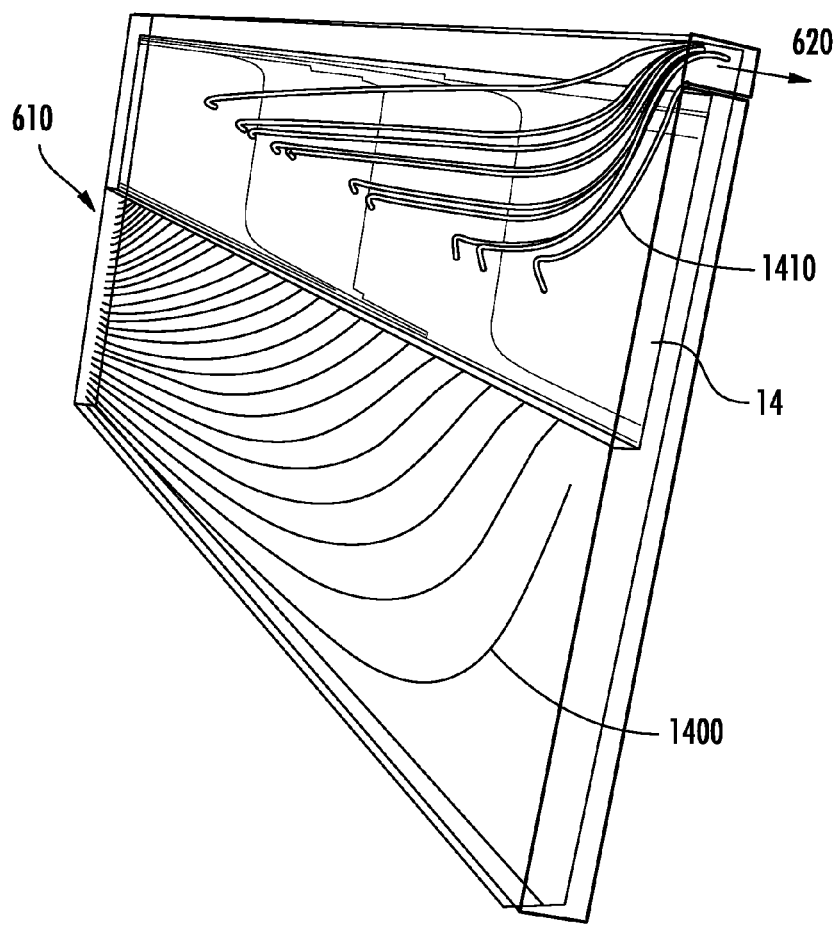
FIG. 14 is a schematic of a 3-D fluid flow model for a trough filtering element.

3-D air flow numerical simulations were done for a trough filtering element with an exit portion of limited height and width, but with a large entrance portion as shown, for example, in FIG. 14. The model did not include radial tapering. The number of troughs was 50 and the flow through those troughs was 10 SCFM. A numerical parametric study with varying exit portion heights helped identify the preferable height of the exit portion, which provides optimum pressure drop. Specifically, with a 1 cm length filtering channel, a 6 inch length filter, a filtering channel width of 1 mm and a filtering web thickness of 20 mils, the pressure drop penalty decreased dramatically as the exit portion height increased from 1 mm to about 2.5 mm.

Referring to FIG. 14, the schematic shows a fluid entrance portion 610 on the lower left side of the filtering element. The flow of the fluid is indicted by trend lines 1400, which are present on the entrance side of the filtering element (i.e., the bottom side of the filtering element), the velocity of the fluid flowing through the entrance side of the filtering element decreases from left to right. At the left of the entrance side of the filtering element, the velocity of the fluid may be about 2.4 m/s. The velocity of the fluid gradually decreases as the fluid moves from left to right in the entrance side of the filtering element (i.e., as the fluid moves away from the fluid entrance portion 610). At the right of the entrance side of the filtering element, the velocity of the fluid nears 0 m/s. Likewise, the pressure in the entrance side of the filtering element decreases from left to right (i.e., as the fluid moves away from the fluid entrance portion 610). The pressure at the left of the entrance side of the filtering element may be about 2.5 kPa, and the pressure at the right of the entrance side of the filtering element may be about 2.0 kPa. Thus, in FIG. 14 the fluid pressure and velocity on the entrance side of the filtering element are highest where the concentration of trend lines 1400 is highest, and the pressure and fluid velocity on the entrance side of the filtering element are lowest where the concentration of trend lines 1400 is lowest.

Still referring to FIG. 14, when the fluid contacts the porous sinuous web 14, some fluid permeates through the porous sinuous web 14 and is exhausted from the filtering element though a fluid exit portion 620. The flow of the fluid in the exit side of the filtering element (i.e., the top side of the filtering element) is indicated by trend lines 1410. The velocity of the fluid and pressure are relatively constant in the exit side of the filtering element. The pressure in the exit side of the filtering element may be about 2.5 kPa. The velocity of the fluid in the exit side of the filtering element may be about 2.4 m/s.

FIG. 15 illustrates the effect as the support leg length (SL) to distance between transverse web portions (DBTP) ratio is increased from about 1.0 to about 4.0. In FIG. 15, SL/DBTP is the support leg length to distance between transverse web portions ratio, the trend line indicated with diamonds shows pressure drop across the entire filtering element, the trend line indicated by squares shows pressure drop across the porous sinuous web, the trend line indicated by circles shows pressure drop across the entrance side of the filtering element, and the trend line indicated by triangles shows pressure drop across the exit side of the filtering element. It can be seen that when SL/DBTP is higher than about 1.0, pressure drop is minimized. As shown in FIG. 15, once the SL/DBTP reaches about 2.5, the pressure drop does not dramatically improve. Thus, it may be considered that a pressure drop may be optimized when the SL/DBTP is from about 1.0 to about 4.0.

The die of Example 4 was designed using this information, the support legs were made 2.5 mm long, to minimize pressure drop in the entrance and exit portions, while retaining as much filtering area as possible.

The invention claimed is:

1. A filter comprising a ceramic filter structure comprising:
   a first support web, a second support web, and a sinuous web between the first and second support webs, wherein
   the first and second support webs and the sinuous web extend parallel to a longitudinal axis of the filter structure,
   the sinuous web comprising transverse web portions and bridging web portions, the bridging web portions connecting adjacent transverse web portions in a sinuous shape in a cross section perpendicular to the longitudinal axis,
   the sinuous web being connected to the first and second support webs by respective first support legs and second support legs, the support legs connecting respective bridging web portions and support webs,
   the filter structure defining a plurality of fluid channels extending along the longitudinal axis of the filter structure from a first lateral end to a second lateral end of the filter structure, and
   a plurality of ceramic plugs that block a plurality of fluid channels such that a first set of ceramic plugs block a first set of fluid channels at the first lateral end of the filter structure and a second set of ceramic plugs block a second set of fluid channels at the second lateral end of the filter structure, wherein
   each fluid channel from the second set of fluid channels is adjacent to a fluid channel from the first set of channels,
   each fluid channel comprises a first portion defined between adjacent transverse web portions and a second portion defined between adjacent support legs,
   the first set of ceramic plugs block each first portion of the second set of channels and block each first portion and each second portion of the first set of fluid channels at the first lateral end,
   each second portion of the second set of fluid channels is not plugged at the first lateral end,
   the second set of ceramic plugs block each first portion of the first set of channels and block each first portion and each second portion of the second set of fluid channels at the second lateral end, and
   each second portion of the first set of fluid channels is not plugged at the second lateral end.

2. The filter of claim 1 wherein the filter comprises a support leg length to distance between transverse web portions ratio of from about 1.0 to about 4.0.

3. The filter of claim 1 wherein the ceramic plugs are comprised of porous ceramic material.

4. The filter of claim 1 wherein the ceramic plugs are comprised of non-porous material.

5. The filter of claim 1 wherein the support webs are comprised of the same material as the sinuous web.

6. The filter of claim 1 wherein at least one of the support webs is comprised of the same material as the sinuous web.

7. The filter of claim 1 wherein the support webs are comprised of different material than the sinuous web.

8. The filter of claim 1 wherein at least one of the support webs is comprised of different material than the sinuous web.

9. The filter of claim 1 wherein the support webs are comprised of porous material.

10. The filter of claim 1 wherein at least one of the support webs is comprised of porous material.

11. The filter of claim 1 wherein the support webs are comprised of non-porous material.

12. The filter of claim 1 wherein at least one of the support webs is comprised of non-porous material.

13. The filter of claim 1 wherein the first and second support webs are comprised of the same material.

14. The filter of claim 1 wherein the first and second support webs are comprised of different materials.

15. The filter of claim 1 wherein the sinuous web contacts the first support web.

16. The filter of claim 1 wherein the sinuous web contacts the second support web.

17. The filter of claim 1 further comprising a plurality of longitudinal end plugs.

18. The filter of claim 1 wherein the support leg length to distance between transverse web portions ratio is from about 1.5 to about 3.5.

19. The filter of claim 1 wherein the sinuous web comprises aluminum titanate, cordierite, niobate, mullite, silicon nitride, sialon, or silicon carbide.

20. The filter of claim 1 wherein the bridging web portions are curved.

21. The filter of claim 1 wherein the first support web and the second support web are concentric.

22. The filter of claim 1 wherein a length of the support legs is shorter than a length of the transverse web portions.

23. The filter of claim 1 wherein the filter structure has a transverse cross-sectional shape that is circular, square, rectangular, triangular, oval, or hexagonal.

24. A filter comprising a ceramic filter structure comprising:
   a first support web, a second support web, and a sinuous web between the first and second support webs, wherein
   the first and second support webs and the sinuous web extend parallel to a longitudinal axis of the filter structure,
   the sinuous web comprising transverse web portions and bridging web portions, the bridging web portions connecting adjacent transverse web portions in a sinuous shape in a cross section perpendicular to the longitudinal axis,
   the sinuous web being connected to the first and second support webs by respective first support legs and second support legs, the support legs connecting respective bridging web portions and support webs,
   the filter structure defining a plurality of fluid channels extending along the longitudinal axis of the filter structure from a first lateral end to a second lateral end of the filter structure, and a plurality of ceramic plugs that block a plurality of fluid channels such that a first set of ceramic plugs block a first set of fluid channels at the first lateral end of the filter structure and a second set of ceramic plugs block a second set of fluid channels at the second lateral end of the filter structure, wherein
- each fluid channel from the second set of fluid channels is adjacent to a fluid channel from the first set of channels
- each fluid channel comprises a first portion defined between adjacent transverse web portions and a second portion defined between adjacent support legs,
- the first set of ceramic plugs block each first portion and each second portion of the first set of fluid channels at the first lateral end,
- each first portion and each second portion of the second set of fluid channels is not plugged at the first lateral end,
- the second set of ceramic plugs block each first portion and each second portion of the second set of fluid channels at the second lateral end, and
- each first portion and each second portion of the first set of fluid channels is not plugged at the second lateral end.

25. The substrate of claim 1 further comprising:
a third support web, and
a second sinuous web between the second support web and the third support web, wherein the second sinuous web comprises transverse web portions and bridging web portions, the bridging web portions connecting adjacent transverse web portions in a sinuous shape in a cross section perpendicular to the longitudinal axis, the second sinuous web being connected to the second and third support webs by respective third support legs and fourth support legs, the support legs connecting respective bridging web portions and support webs.

* * * * *

UNITED STATES PATENT AND TRADEMARK OFFICE
CERTIFICATE OF CORRECTION

PATENT NO. : 10,030,554 B2
APPLICATION NO. : 14/792011
DATED : July 24, 2018
INVENTOR(S) : William Peter Addiego et al.

Page 1 of 1

It is certified that error appears in the above-identified patent and that said Letters Patent is hereby corrected as shown below:

In the Claims

In Column 16, Line 7, Claim 25, delete "The substrate" and insert -- The filter --, therefor.

Signed and Sealed this
Third Day of March, 2020

Andrei Iancu
*Director of the United States Patent and Trademark Office*